(12) United States Patent
Chau et al.

(10) Patent No.: US 9,742,909 B2
(45) Date of Patent: Aug. 22, 2017

(54) SYSTEM AND METHOD FOR DETERMINING AVAILABILITY STATUSES FOR USERS

(71) Applicant: RingCentral, Inc., Belmont, CA (US)

(72) Inventors: Vi Dinh Chau, San Francisco, CA (US); Naveen Sanjeeva, Saratoga, CA (US); Anton Nikitin, San Mateo, CA (US)

(73) Assignee: RingCentral, Inc., Belmont, CA (US)

( * ) Notice: Subject to any disclaimer, the term of this patent is extended or adjusted under 35 U.S.C. 154(b) by 165 days.

(21) Appl. No.: 14/709,815

(22) Filed: May 12, 2015

(65) Prior Publication Data

US 2015/0373192 A1 Dec. 24, 2015

Related U.S. Application Data

(63) Continuation of application No. 14/308,661, filed on Jun. 18, 2014, now Pat. No. 9,060,050.

(51) Int. Cl.
| | |
|---|---|
| H04L 12/24 | (2006.01) |
| H04M 7/00 | (2006.01) |
| H04M 3/42 | (2006.01) |
| H04L 12/58 | (2006.01) |
| H04L 29/08 | (2006.01) |

(52) U.S. Cl.
CPC ...... *H04M 3/42374* (2013.01); *H04L 51/043* (2013.01); *H04L 67/22* (2013.01); *H04M 3/42357* (2013.01); *H04M 3/42365* (2013.01); *H04M 7/006* (2013.01); *H04L 67/24* (2013.01)

(58) Field of Classification Search
None
See application file for complete search history.

(56) References Cited

U.S. PATENT DOCUMENTS

| | | |
|---|---|---|
| 6,545,697 B1 | 4/2003 | Parker et al. |
| 7,958,212 B1 | 6/2011 | Wong et al. |
| 8,175,904 B2 | 5/2012 | Templeton |
| (Continued) | | |

FOREIGN PATENT DOCUMENTS

EP    1 453 283 A1    9/2004

OTHER PUBLICATIONS

"3rd Generation Partnership Project; Technical Specification Group Core Network and Terminals; Combining CS calls and IMS sessions; Stage 3 (Release 7)," 3GPP Standard; 3GPP TR 24.879, 3rd Generation Partnership Project (3GPP), Mobile Competence Centre; 650, Route des Lucioles; F-06291, No. V7.0.0.0, Mar. 1, 2006, pp. 1-73.

*Primary Examiner* — Duc Duong
(74) *Attorney, Agent, or Firm* — Fish & Richardson P.C.

(57) ABSTRACT

Methods, systems, and apparatus, including computer programs encoded on a computer storage medium, for determining availability statuses for users of a communication service provider system. One of the methods includes obtaining data identifying a plurality of availability status features for a user of a communication service provider system and a respective weight for each of the availability status features; determining a respective current value of each of the availability status features; and determining an aggregate user availability status based at least in part on the current values of the availability status features and on the weights for the availability status features.

20 Claims, 6 Drawing Sheets

(56) References Cited

U.S. PATENT DOCUMENTS

| | | |
|---|---|---|
| 8,467,514 B1 | 6/2013 | Makhmudov et al. |
| 2002/0078150 A1 | 6/2002 | Thompson et al. |
| 2006/0068815 A1* | 3/2006 | Caspi ................... H04W 88/06 |
| | | 455/466 |
| 2006/0072715 A1 | 4/2006 | Michael et al. |
| 2006/0155733 A1* | 7/2006 | John ................ H04M 3/42374 |
| 2007/0071209 A1 | 3/2007 | Horvitz et al. |
| 2007/0198725 A1 | 8/2007 | Morris |
| 2007/0226357 A1 | 9/2007 | McMurry et al. |
| 2007/0233875 A1* | 10/2007 | Raghav ................ G06Q 10/107 |
| | | 709/227 |
| 2009/0009343 A1 | 1/2009 | Boyer et al. |
| 2009/0010419 A1 | 1/2009 | Toebes et al. |
| 2009/0307349 A1 | 12/2009 | Harris et al. |
| 2010/0183134 A1 | 7/2010 | Vendrow et al. |
| 2011/0035443 A1 | 2/2011 | Jensen |
| 2011/0183645 A1 | 7/2011 | Chawla |
| 2012/0036261 A1 | 2/2012 | Salazar et al. |
| 2012/0151357 A1 | 6/2012 | Roche et al. |
| 2013/0019004 A1 | 1/2013 | Sylvain |
| 2013/0035076 A1 | 2/2013 | Aaron et al. |
| 2013/0046550 A1* | 2/2013 | Schoenberg ... G06Q 10/063114 |
| | | 705/2 |
| 2013/0072153 A1 | 3/2013 | Lawson et al. |
| 2013/0218622 A1 | 8/2013 | MacKenzie et al. |
| 2013/0343530 A1 | 12/2013 | Makhmudov et al. |
| 2014/0067960 A1 | 3/2014 | Biehl et al. |
| 2014/0126713 A1 | 5/2014 | Ristock et al. |

\* cited by examiner

SYSTEM AND METHOD FOR DETERMINING AVAILABILITY STATUSES FOR USERS

CROSS-REFERENCE TO RELATED APPLICATION

This is a continuation of U.S. application Ser. No. 14/308,661, filed on Jun. 18, 2014, the disclosure of which is hereby incorporated by reference in its entirety.

BACKGROUND

This disclosure relates to determining availability statuses for users of a communication service provider system.

Users of a communication service provider system can be made aware of the availability status of other users of the communication service provider system. For example, users that are authorized to view the availability status of a particular user may be able to view an indicator of the availability status on their Voice Over Internet Protocol (VOIP) softphone, e.g., using a busy lamp field (BLF) associated with the user. As another example, an indicator of the availability status of the user may be viewable to other users in a chat application that allows users of the communication service provider system to instant message each other. Example availability statuses for users of the communication service provider system can include one or more of "on the phone," "phone is ringing," "do not disturb," "unavailable," "busy," "out of office," "away from desk," "at home," "mobile," "traveling," and other similar statuses.

SUMMARY

In general, one innovative aspect of the subject matter described in this disclosure can be embodied in methods that include the actions of obtaining data identifying a plurality of availability status features for a user of a communication service provider system and a respective weight for each of the availability status features; determining a respective current value of each of the availability status features; and determining an aggregate user availability status based at least in part on the current values of the availability status features and on the weights for the availability status features.

Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

These and other embodiments can optionally include one or more of the following features. The plurality of availability status features can include an account parameters feature that identifies availability indicators associated with account parameters configured by the user with the communication service provider system. The plurality of availability status features can include a telephony status feature that identifies a line status for one or more communication devices associated with the user. The line status feature can identify an aggregated line status aggregated from respective line statuses of each of a plurality of communication devices associated with the user. The plurality of availability status features can include a communication status feature that identifies a non-telephony communication status of the user. The plurality of availability status features can include a session activity feature that identifies a time elapsed since a most recent interaction by the user with any service provided by the communication service provider system. The plurality of availability status features can include an action pattern feature that identifies action patterns derived from user interactions with services provided by the communication service provider system. The plurality of availability status features can include a location-based feature that identifies an availability indicator for a user that is derived from a physical location of the user. The actions can further include determining the weights for the availability status features from interactions of other users with the communication service provider system based on, for each availability status feature, a proportion of time that the other users responded to communications while a value of the availability status feature indicated that the other user was unavailable to respond to the communication. The actions can further include: receiving a user input modifying one or more of the availability status features or one or more of the weights; and modifying the availability status features for the user and the weights in response to the input. The plurality of availability status features can include an external availability status feature that identifies availability statuses for the user obtained by the communication service provider system from services that are not provided by the communication service provider system.

The details of one or more embodiments of the subject matter described in this disclosure are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

The present disclosure generally describes determining availability statuses for users of a communication service provider system. In order to determine the availability status for a user, a set of availability status features for the user and a respective weight for each of the features are identified. Current values for each of the availability status features are obtained, and the current values of the features are used in combination with the weights to determine an aggregate availability status for the user.

Particular embodiments of the subject matter described in this disclosure can be implemented so as to realize one or more of the following advantages. By computing an aggregate availability status for a user from multiple availability features, the user's availability can be accurately reflected. Because the aggregate availability status combines availability data from multiple inputs, the availability status for a user who appears unavailable according to some inputs but is actually available for communication can be accurately determined. Similarly, the availability status for a user who appears available according to some inputs but is actually busy or otherwise unable to communicate can be accurately determined. Advantageously, other users of the communication service provider system can more effectively communicate with the user by being made aware of a more accurate availability status for the user.

Figure 1:
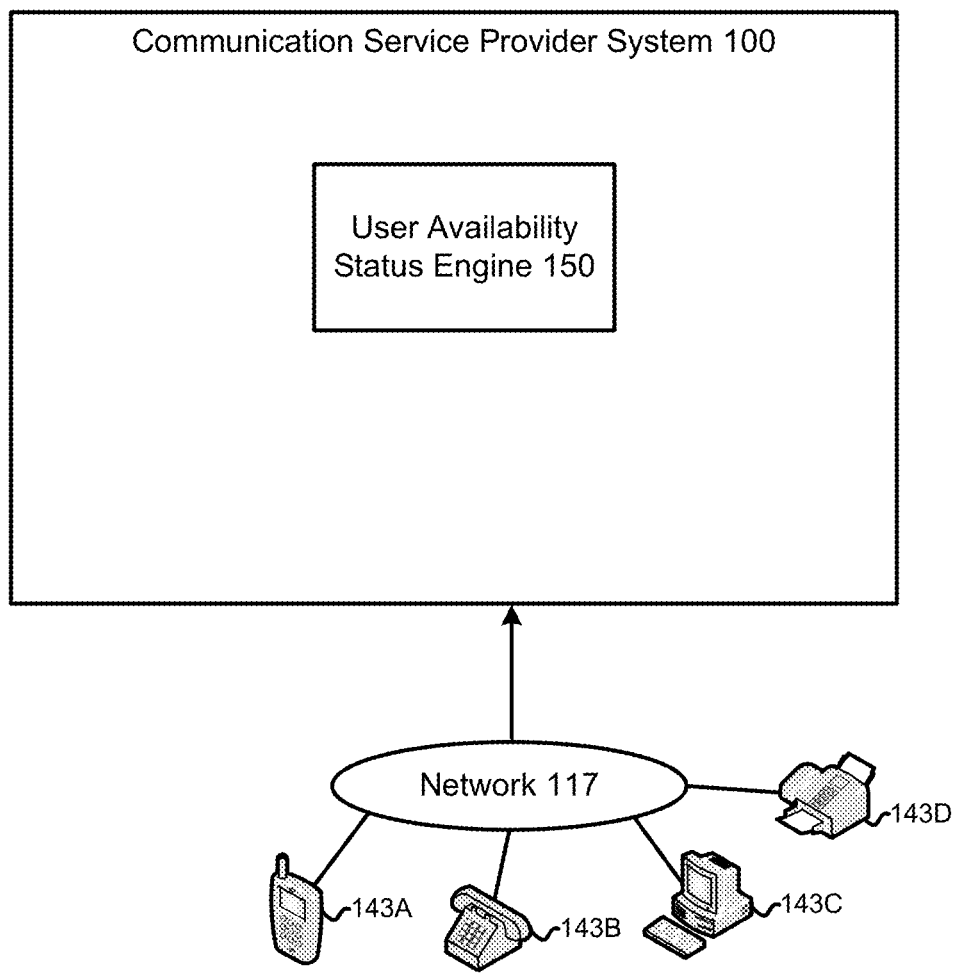
FIG. 1 shows an example communication service provider system.

FIG. 1 shows an example communication service provider system 100. The communication service provider system 100 is an example of a system implemented as computer programs on one or more computers in one or more locations, in which the systems, components, and techniques described below can be implemented.

The communication service provider system 100 provides communication services to users of the system. In some examples, the communication service provider system 100 may be a hosted private branch exchange (PBX) system that provides PBX services that include voice-over-Internet-Protocol (VOIP) telephony services to users of the system. The services provided by the communication service provider system 100 can also include other kinds of communication. For example, the communication services provided by the communication service provider system 100 can also include one or more of: short message service (SMS) messaging, faxing, instant messaging, video conferencing, e-mail, and so on.

Users of the communication service provider system 100 can use various communication devices 143A-143D to communicate with the communication service provider system 100 and other users of the system over a network 117. The communication devices can include, for example, a mobile device 143A, a landline phone 143B, a computer 143C, and a facsimile (fax) machine 143D. The landline phone 143B can be, for example, a plain old telephone service (POTS) phone or a voice-over-Internet Protocol (VOIP) softphone. The computer 143C can be installed with telephony software to perform functions of a phone. The computer 143C can also be installed with other software, e.g. a web browser, which allows it to communicate with the communication service provider system 100 over the network 117. Other communication devices that are not shown can also be used as the communication devices 143A-143D, e.g., computer tablets and other personal digital devices.

The network 117 may be, e.g., a local area network (LAN), a wide area network (WAN), or a combination of the two. Though not illustrated, requests from communication devices 143A-143D intended for the communication service provider system 100 can be routed through other provider networks (e.g. cellular networks, PSTN, wireless networks, etc.) and gateways before reaching the network 117.

The communication service provider system 100 includes a user availability status engine 150. The user availability status engine 150 determines user availability statuses for users of the communication service provider system 100. Generally, the user availability status engine 150 determines the user availability status for a user from current values of availability status features for the user and weights associated with each of the user availability features. An availability status feature for a user is an indicator of user availability that is derived from user interactions with services provided by the communication service provider system 100. In some embodiments, availability status features also include features derived from user interactions with external services, e.g., an instant messaging service associated with the user or a calendaring service associated with the user. Availability status features and determining user availability statuses using the features are described in more detail below with reference to FIG. 2.

Once an availability status for a user of the communication service provider system 100 has been determined by the user availability status engine 150, the communication service provider system 100 provides data identifying the availability status for the user to the communication devices of other users of the system, e.g., other users that the user has authorized to be able to view the user's availability. For example, users that are authorized to view the availability status of a particular user may be able to view an indicator of the particular user's availability status on their VOIP softphone, e.g., using a busy lamp field (BLF) associated with the particular user. In some examples, the indicator is presented in a graphical user interface (GUI) displayed on a display of communication devices 143A-143D. As another example, an indicator of the availability status of the user may be viewable to other users in one or more communication applications that allow the users of the communication service provider system 100 to communicate with one another.

Figure 2:
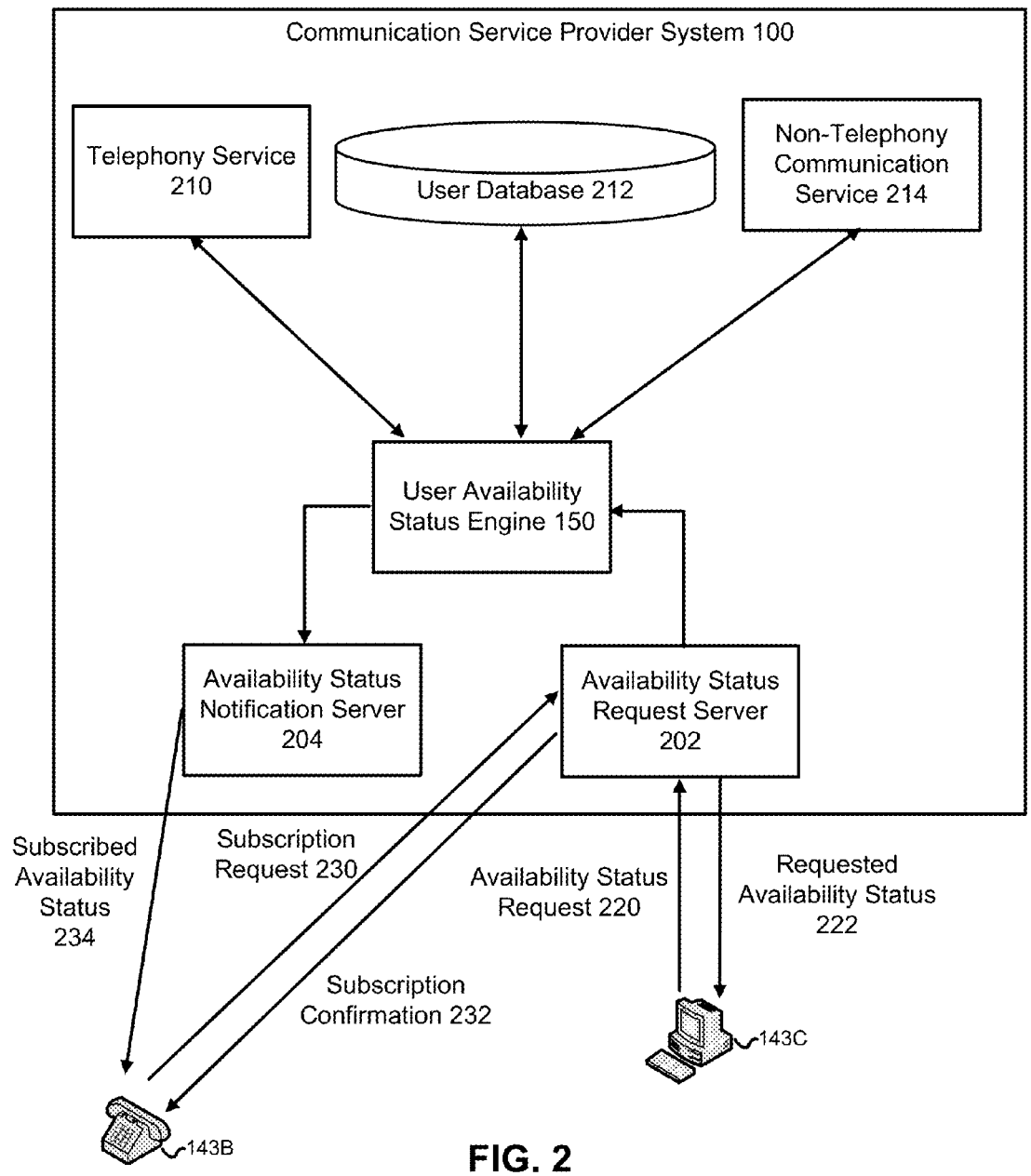
FIG. 2 shows availability status request processing by the example communication service provider system.

FIG. 2 shows availability status request processing by the example communication service provider system. As shown in FIG. 2, a user of a communication device, e.g., the communication device 143C, can submit a request 220 to the communication service provider system 100 for an availability status of a particular user of the communication service provider system 100. An availability status request server 202 receives the request 220 and forwards the request to the user availability status engine 150.

In response to receiving the request, the user availability status engine 150 determines whether a current availability status has been computed for the particular user. If the current status has already been computed, the user availability status engine 150 provides the status to the availability status request server 202. If the current has not yet been computed, the user availability status engine 150 accesses a user database 212 that stores data identifying the availability status features that are included in the set of availability status features for the user and a corresponding current weight value for each feature in the set. The user availability status engine 150 obtains data necessary to determine a current value for each of the features. Examples of availability status features are described in more detail below with reference to FIG. 3. Depending on the features that are in the set, the user availability status engine 150 can obtain the data from any of a variety of sources within the communication service provider system 100.

For example, the user availability status engine 150 can send a request to a telephony service 210 for a line status of the user for one or more communication devices associated with the particular user. The line status for a communication device identifies whether an active call is occurring on the communication device, a call is currently on hold on the communication device, no call activity is occurring on the communication device, whether do not disturb mode or other special mode is active for the communication device, and so on.

As another example, the user availability status engine 150 can access certain account parameters for the particular user from the user database 212 for use in computing a current value of an availability status for the particular user. For example, the account parameters may include hours of operation information for the particular user, any manual availability statuses that have been configured by the particular user, geo-fencing rules that have been configured by the particular user, and so on.

As another example, the user availability status engine 150 can send a request to a non-telephony communication service 214 for information about the user's interaction with non-telephony communication services provided by the non-telephony communication service 214, e.g., whether the particular user is participating in a video conference or an online meeting, the time of the particular user's last interaction with the services provided by the communication service provider system 100, and so on. While a single non-telephony communication service 214 is shown in FIG. 2, many separate non-telephony communication services may be offered by the communication service provider system 100 and information from any of the services may be used by the user availability status engine 150 in computing an availability status for a given user.

Additionally, in some embodiments, the user availability status engine 150 may have access to availability statuses for the user from services that are not provided by the system, e.g., that are external to the communication service provider system 100. These external availability statuses may also be used by the user availability status engine 150 in computing availability statuses. For example, the external availability statuses may include availability data from a calendaring service associated with the user or an external instant messaging service associated with the user.

As will be described in more detail below, the availability status engine 150 may also have access to additional sources of data. For example, the availability status engine 150 may have access to sensor data from mobile communication devices of users of the communication service provider system 100, e.g., Global Positioning System (GPS) coordinates. As another example, the availability status engine 150 may have access to data identifying a state of various communication devices associated with the user, e.g., whether the device is powered off, out of service, or powered on and functioning properly. As another example, the availability status 150 may have access to data that identifies network failures along network communication paths used by the user to connect to the telecommunication service provider system 100.

The user availability status engine 150 computes a current availability status for the user from the data and the weights for each of the features. That is, the user availability status engine 150 determines a current value for each of the features from the obtained data and uses the current values and the weights to determine the current availability status for the particular user. Determining a current availability status is described in more detail below with reference to FIG. 3. The user availability status engine 150 provides the current availability status for the particular user to the availability status request server 202. Once the availability status request server 202 has received the current availability status, the availability status request server 202 can respond to the availability status request 220 by providing the requested availability status 222 to the communication device 143C.

Additionally, communication devices, e.g., the communication device 143B, can subscribe with the communication service provider system 100 to receive updates of availability statuses for particular users. For example, a user can cause VOIP softphone to subscribe to availability status updates for a particular user of the communication service provider system 100 by configuring a BLF on the VOIP softphone to display an indication of the particular user's availability status. The communication device then submits a subscription request 230 to subscribe to updates of the availability status of the user.

The subscription request 230 is received by the availability status request server 202 and forwarded to the user availability status engine 150. The availability status request server 202 responds to the subscription request 230 by sending a subscription confirmation 232 to the communication device 143B to indicate to the communication device 143B that the subscription request was successful. The availability status request server or the user availability status engine 150 updates a database, e.g., the user database 212 or a separate subscription database, with data that indicates that the communication device 143B has subscribed to updates of the particular user's availability status. The user availability status engine 150 periodically calculates the current availability status for the particular user and provides the current status to an availability status notification server 204. The notification server 204 then provides the current status to the communication device 143B, e.g., as a subscribed availability status update 234, whenever the availability status for the particular user has been updated. For example, the notification server 204 provides the subscribed availability status update 234 to the communication device 143B as a push notification.

Figure 3:
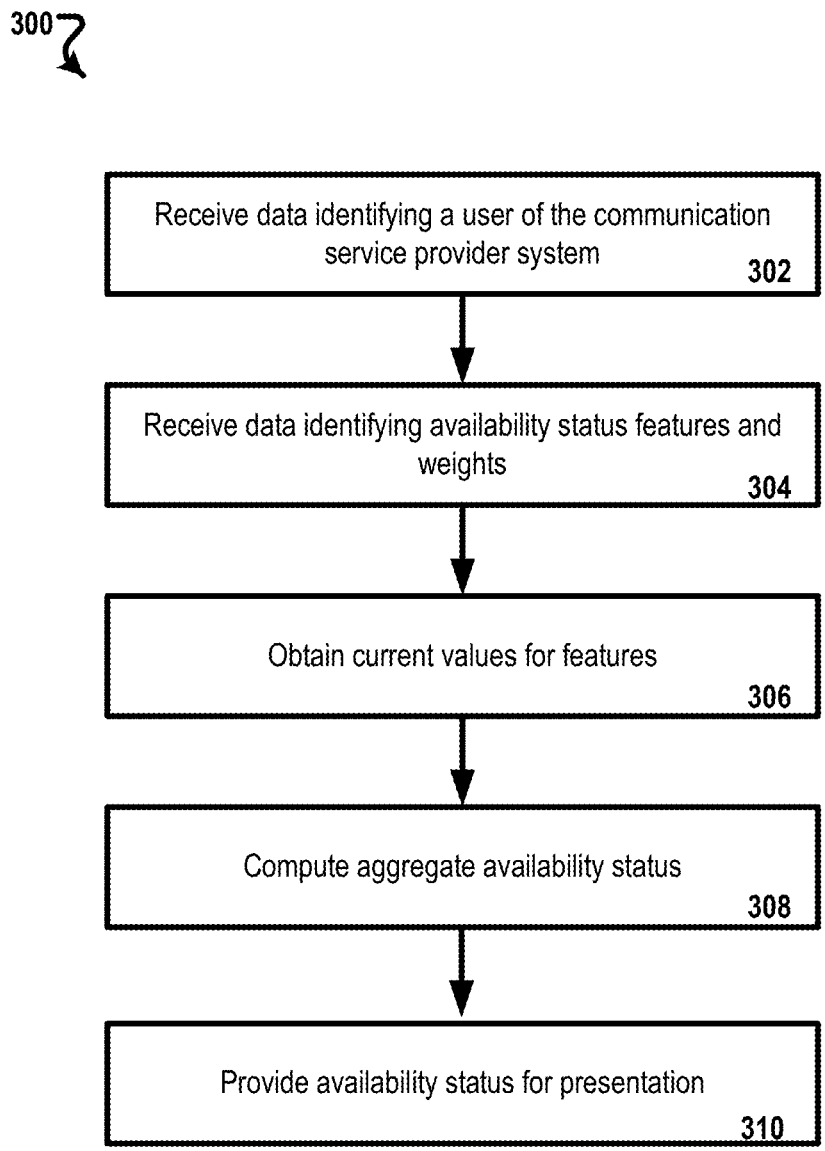
FIG. 3 is a flow diagram of an example process for determining an availability status for a user of a communication service provider system.

FIG. 3 is a flow diagram of an example process 300 for determining an availability status for a user of a communication service provider system. The process 300 can be performed by a system of one or more computers. For example, a communication service provider system, e.g., the communication service provider system 100 of FIG. 1, can perform the process 300.

At step 302, data identifying a user of the communication service provider system is received. For example, a request for an availability status of the user or of an extension with which the user is associated can be received. Alternatively, the availability statuses for users of the communication service provider systems can be automatically updated periodically, e.g., at fixed time intervals. For example, a communication device associated with one user of the communication service provider system may subscribe to receive periodic updates of the availability status of another user of the communication service provider system.

At step 304, data identifying a set of availability status features for the user and a respective weight for each of the features in the set is received.

The features in the set of availability status features can include any of a variety of features associated with the user that are available to the communication service provider system.

For example, the availability status features include an account parameters feature. The account parameters feature identifies availability status indicators associated with account parameters configured by the user with the communication service provider system. For example, the account parameters feature may be an hours of operation feature. The hours of operation feature identifies availability indicators associated with time periods configured by the user with the communication service provider system. For example, the time periods configured by the user may include business hours for the user. During business hours for the user, the availability status feature may have a value indicating that the user should be available. After or before business hours for the user, the availability status feature may have a value indicating that the user should not be available. As another example, the time periods configured by the user includes vacation or other out-of-office events configured by the user. In some embodiments, if the user has not configured any time periods with the system, default values for the hours of operation feature can be used. For example, default values for the business hours for the user may specify that the user be shown as "available" between 9 A.M. local time to 5 P.M. local time.

As another example, the availability status features include a telephony status feature. The telephony status feature identifies a line status for the user for one or more communication devices associated with the user. The line status for a communication device identifies whether an active call is occurring on the communication device, a call is currently on hold on the communication device, no call activity is occurring on the communication device, whether do not disturb mode or other special mode is active for the communication device, and so on. In some embodiments, the availability status features include a separate feature for each of the communication devices associated with the user. In some other embodiments, the availability status features include an aggregated line status for the user that is aggregated from all of the communication devices associated with the user. For example, the communication service provider system can aggregate the line statuses from each communication device associated with a user in accordance with a set of rules that define a priority among various potential line statuses, e.g., so that if the line status on one of the communication devices associated with the user indicates that the line is busy while the line status on another communication device indicates that no call activity is occurring, the aggregated line status for the user indicates that the line is busy. As another example, the communication service provider system can aggregate the line statutes in accordance with a set of rules that define a priority among the communication devices associated with the user, e.g., so that the line status for a communication device having a higher priority than another communication device will override the line status for the other communication device.

As another example, the availability status features include a communication status feature. The communication status feature identifies a non-telephony communication status of the user, e.g., whether the user is using non-telephony communication services provided by the communication service provider system to communicate with other users. For example, the communication status feature can indicate whether the user is participating in a video chat or conference with one or more other users or participating in a virtual, e.g., online, meeting with one or more other users.

As another example, the availability status features include a session activity feature. The session activity feature characterizes recent user interactions with various services provided by the communication service provider system. For example, the session activity feature can identify the time elapsed since the most recent interaction by the user with any service provided by the system, the service that the user most recently interacted with, or both.

As yet another example, the availability status features include an action pattern feature. The action pattern feature identifies action patterns computationally inferred from user interactions with various services provided by the communication service provider system. For example, the action pattern can identify patterns derived from successive actions taken by the user with respect to a particular service, e.g., if the user has declined more than a threshold number of successive calls received during a most recent time window of a specified duration or has failed to respond to more than a threshold number of successive instant messages or SMS messages from more than a threshold number of users during the most recent time window, it can be inferred that the user is unavailable to receive communications.

As another example, the availability status features include a location-based feature. The location-based feature identifies availability indicators for the user that are derived from the physical location of the user, e.g., as determined from location information received from a mobile communication device of the user, e.g., global positioning service (GPS) coordinates or Wi-Fi signals received from the mobile communication device. For example, the user can submit inputs to the communication service provider system that associate physical locations with availability statuses. For example, the user may generate a geo-fence that identifies the location of a conference room and associate the geo-fenced area with an availability status, e.g., a status that indicates that the user is unavailable. As another example, the user may generate a geo-fence that identifies the location of the user's office and associate the geo-fenced area with an availability status, e.g., a status that indicates that the user is available.

As another example, the availability status features include an external availability status feature. The external availability status feature identifies availability statuses for the user obtained by the communication service provider system from services that are not provided by the system. For example, the system may obtain data identifying an availability of the user from a calendaring service used by the user, e.g., data that identifies blocks of time that are denoted as "busy," "tentative," or "out of the office." As another example, the system may obtain data identifying an availability of the user from external messaging services used by the user. In some example embodiments, the availability status features include a separate external availability status feature for each external service from which the system obtains availability data for the user. In some other embodiments, the features include an aggregated external availability status feature that is aggregated across all external services from which the system obtains availability data for the user.

As another example, the availability status features include a network connectivity feature. The network connectivity availability status feature identifies an availability status for the user derived from connectivity data for the user. For example, the connectivity data may identify a state of one or more communications devices of the user, e.g., powered on and operational, powered off, or out of service. If all of the communication devices associated with the user are either powered off or out of service, the network connectivity feature can indicate that the user is unavailable. As another example, the connectivity data identifies whether a network failure has been detected along a network communication path typically used by the user to communicate with the system. If a network failure has been detected, the network connectivity feature indicates that the user is unavailable or cannot be reached.

In some embodiments, the availability status features included in the set of availability status features are different for different users of the communication service provider system. For example, for some users, e.g., for users that have not configured their availability status settings, the features in the set include only default availability status features specified by the communication service provider system. That is, one or more of the features described above may be included in a default set of features that is initially associated with each new user of the system. For other users, the features may include one or more of the default availability status features and additional features specified by the user. That is, the user may have modified the features included in the set of features associated with the user. Modifying the features for a user is described in more detail below with reference to FIG. 3.

Similarly, in some example embodiments, for some users, the respective weight for each of the features may be a default weight that is assigned by the system for each new user of the system. For other users, however, the weights may be modified in response to inputs received from the user. Modifying weights for features is described in more detail below with reference to FIG. 3. In some embodiments, the default weights are constants that are assigned by a system administrator.

In some other embodiments, however, the default weights are learned from interactions of other users with the system. For example, for each feature, the default weight for a given feature may be determined from the proportion of time that users responded to a communication, e.g., answered a call or responded to a SMS message or instant message, while the value of the feature indicated that the user was unavailable to respond to the communication. That is, the weight for a feature for which users responded to communications a larger proportion of the time when the feature indicated that the user should be unavailable may be lower than the weight for a feature for which the proportion is smaller. For example, if users of the system rarely respond to communications when the value of their telephony status feature indicates that they are unavailable but relatively frequently respond to communications when their hours of operation feature indicates that they are unavailable, the default weight for the telephony status feature may be higher than the default weight for the hours of operation feature.

At step 306, current values of each of the availability status features in the set for the user are obtained. Depending on the feature, the value of the feature can be received directly from one or more communication services provided by the system or from one or more external communication services, or computed from data received from the communication services.

At step 308, an aggregate availability status for the user is computed from the availability indicators for the user. In order to compute the aggregate availability status, the weight for each availability status feature is applied to the value of the feature, and the weighted values are combined to generate the aggregate availability status.

In some embodiments, each feature value is converted to a numeric value, e.g., in accordance with a pre-determined mapping, and the numeric values are multiplied by the corresponding weight. The weighted values are then combined, e.g., by taking the sum or the product of the weighted values, to obtain an aggregate value. The aggregate value can then be mapped to an aggregate availability status. That is, each possible aggregate availability status, e.g., "busy," "available," and "offline," can be associated with a range of aggregate values. The aggregate value computed for the particular user can then be mapped to an aggregate availability status by determining which range the aggregate value falls in and mapping the aggregate value to the corresponding aggregate availability status. Thus, values of availability statuses having a higher weight have more influence on the final value of the aggregate availability status for the user than values of availability statutes having a lower weight.

In some embodiments, in order to convert the feature values to numeric values, an individual availability status is computed for each of the features from the current value for the feature. Each individual availability status can then be mapped to a corresponding numeric value using the pre-determined mapping.

Optionally, one or more individual availability statuses are provided to a requesting user with the aggregate availability status. For example, requesting users may be interested, in addition to finding out the aggregate availability status of a user, in knowing whether the user is currently on the phone or whether the user is currently participating in an online meeting or a video conference. Users may be given the option of specifying an individual availability status with the aggregate availability status request, and can be provided with the corresponding individual availability status in response to the request.

In other examples, the system predicts an availability status for the user based on prior user behavior. For example, the system can track various user interactions with services provided by the system and, for each of the interactions, determine the values of the availability status features at those times. The system then compares the current values of the availability status feature values to previous user interactions with the system when the availability status features had the same or similar values and predict the availability status for the user based on the comparison. For example, if the user has responded to received communications more than a threshold proportion of the time when the availability status features had the same or similar values as the current values, the system may predict that the user is available. As another example, if the user has responded to received communications less than a threshold proportion of the time when the availability status features had the same or similar values as the current values, the system may predict that the user is unavailable. Other ways of predicting the availability status by analyzing previous user interactions with the system while the values of the availability status features were the same as or similar to current availability status feature values are possible.

In some embodiments, the computed or predicted availability status is overridden when certain criteria are satisfied. That is, even if the computed status indicates one status for the user, if the criteria are satisfied, a different status is selected for the user.

For example, in some embodiments, users are given the option of configuring a manual availability status that overrides the aggregate availability status. In these embodiments, if the user has configured a manual status that indicates that the user is unavailable, e.g., has configured a do not disturb status with the system, the aggregate availability status for the user will indicate that the user is unavailable even if the status computed from the features indicates that the user should be available.

As another example, in some embodiments, some of the users of the system may be classified as having particular types, with certain types not being allowed to have certain availability statuses. In these embodiments, if the computed status is a status that is not allowed for the user, the aggregate availability status for the user is set to an allowed status. For example, certain users of the system, e.g., employees that work in outbound sales, may not be allowed to accept incoming calls and the status for those users must always indicate that the user is unavailable. Thus, if the computed status for the user indicates that the user is available, the status is overridden to indicate that the user is unavailable, e.g., to a do not disturb status or an offline status. As another example, certain users of the system, e.g., call center agents, may be required to always be available to accept inbound calls and the status for those users must always indicate that the user is available. Thus, if the computed status for the user indicates that the user is unavailable, the status is overridden to indicate that the user is available to receive communications.

At step 310, the aggregate availability status for the user is provided for presentation to other users. For example, the aggregate availability status may be provided for display on a GUI of a softphone or other communication device of another user authorized to view the availability status of the user.

Figure 4:
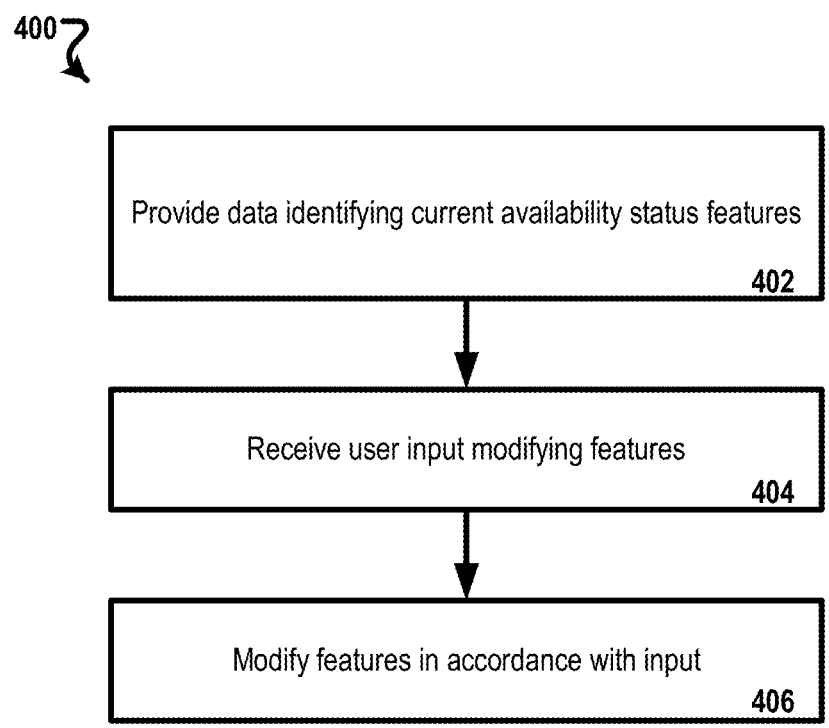
FIG. 4 is a flow diagram of an example process for modifying availability status features for a user of a communication service provider system.

FIG. 4 is a flow diagram of an example process 400 for modifying availability status features for a user of a communication service provider system. The process 400 can be performed by a system of one or more computers. For example, a communication service provider system, e.g., the communication service provider system 100 of FIG. 1, can perform the process 400.

At step 402, data identifying current availability status features for a user and current weights for each of the availability status features is provided for presentation to the user. If the user has not yet modified the features or the weights, the features are default availability status features assigned to the user by the communication service provider system and the weights are default weights assigned to each feature by the system.

At step 404, a user input is received modifying the availability status features. For example, the user input may be an input modifying the current weights associated with one or more of the current availability status features or an input removing one of the current availability status features.

As another example, the user input may be an input selecting an additional availability status feature from a presentation of possible additional availability status features to add to the current availability status features. That is, before a user has modified the features in the set of features for the user, some of the features described above may be included in the set of features for the user, while other features described above can be presented to the user as possible additional features that can be included in the set of features for the user. In order to associate the additional availability status feature with a weight, the user may be prompted to submit an input specifying a weight for the additional availability status. In some embodiments, if the user does not specify a weight for the additional availability status, the additional availability status is associated with a default weight as described above or is assigned a minimum weight, i.e., so that if the user does not associate the additional availability status feature with a weight, the additional availability status feature has a minimal impact on the aggregate availability status for the user.

At step 406, the availability status features for the user are modified in accordance with the received user input. That is, depending on the user input, the set of availability status features for the user may be modified to remove a feature from the set or to add another feature to the set. Alternatively, instead of removing or adding a feature, the weights for one or more of the features in the set can be adjusted in accordance with the received user input. Optionally, in response to any user input modifying the features in the set or weights for one or more features in the set, the weights for all of the features in the set are re-normalized.

Figure 5:
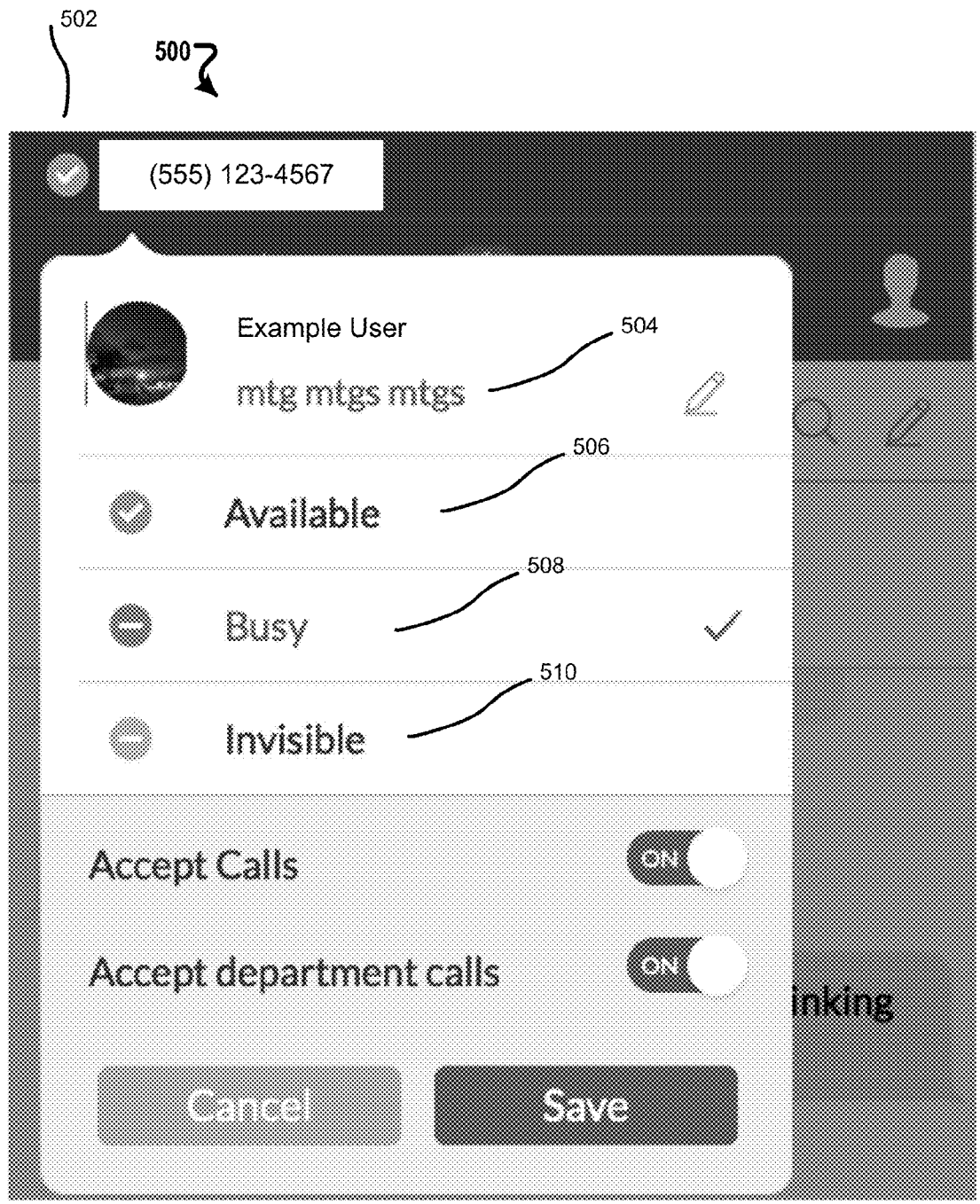
FIG. 5 shows an example user interface for configuration of an availability status.

FIG. 5 shows an example user interface 500 for configuration of a user availability status. The example user interface 500 displays an indicator 502 of a current availability status for a user of the communication service provider system 500 that indicates that the user is currently available. The current availability status is an aggregate availability status computed for the user by the communication service provider system. However, the user can submit an input to the communication service provider system through the user interface 500 to configure a manual user availability status that overrides the aggregate availability status computed by the system. In particular, the user can select a user interface element 506 that configures the manual user availability status to indicate that the user is available or select a user interface element 508 that configures the manual user availability status to indicate that the user is busy.

The user can also select a user interface element 510 to indicate that the user is invisible. If the user has indicated that they are invisible, other users of the communication service provider system are prevented from viewing the current availability status for the user. That is, even if another user has subscribed to receive status updates for the user and is authorized to view the availability status of the user, the other user will be prevented from viewing the user's current availability status until the user submits an input indicating that the user is no longer invisible.

Additionally, the user can submit a text input into a text entry field 504 that configures a personalized message to be displayed to other users along with the current availability status for the user. For example, once the user has entered the text input into the text entry field 504, any time the user availability status for the user is provided to a communication device that has the capability to display text in association with a status indicator, the communication service provider system will provide the text input to the communication device in association with the current availability status for the user.

Figure 6:
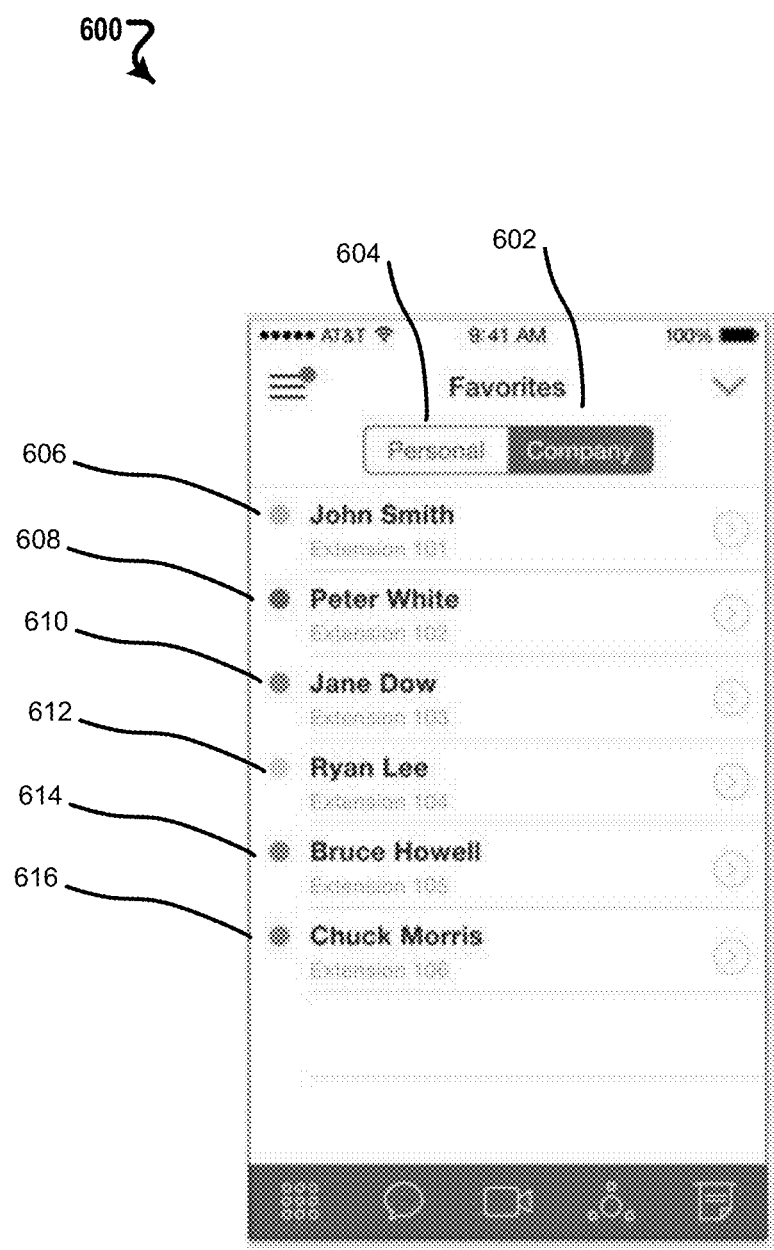
FIG. 6 shows an example user interface for viewing the aggregate availability statuses of other users.

FIG. 6 shows an example user interface 600 for viewing the aggregate availability statuses of other users. The user interface 600 allows a user to select between viewing availability statuses for personal contacts 604 and company directory contacts 602. In the illustrated example, company directory contacts 602 are selected and the user interface 600 includes indicators 606-616 that show the current aggregated availability statuses for various company directory contacts of the user. For example, the user may have submitted a request to the communication service provider system in order to subscribe to the availability status for each of the users. As another example, some or all of the users may have their availability status displayed to the user by default, for example, as a result of being in the same department as the user or of being managed by the user.

In the illustrated example embodiment of FIG. 6, the indicator 606 indicates that the corresponding user has been determined to be idle, the indicator 608 indicates that the corresponding user has been determined to be busy, and indicators 610, 614, and 616 indicate that the corresponding users have been determined to be available. Indicator 612 indicates that the corresponding user is offline or that the current aggregate availability status for the corresponding user is unavailable, for example, because the user to which the user interface 600 is being presented does not have permission to view the aggregate availability status or because the corresponding user has set a manual availability status to invisible.

In some examples, if the user selects to view personal contacts 604, the system can display a user interface to the user that includes indicators of external availability statuses obtained for selected personal contacts of the user. In other examples, the indicators may be of an aggregate availability status for the personal contacts of the user, for example, availability statuses aggregated across multiple external availability statuses, or availability statuses aggregated generated using other current availability status feature values that are available to the system for the personal contact of the user.

In some examples, users are given the option of configuring different availability status indicators for when their status appears in a personal contact list of another user and when their status appears in a company contact list for another user. For example, a user configuring an account parameter can be given the option to configure a rule that specifies that being outside of business hours for the user is indicative of the user being unavailable on company contact lists but indicative of being available on personal contact lists. As another example, a user configuring a manual availability status can be given the option to configure one manual availability status to be displayed in personal contact lists and another manual availability status to be displayed in company contact lists.

Embodiments of the subject matter and the operations described in this disclosure can be implemented in digital electronic circuitry, or in computer software, firmware, or hardware, including the structures disclosed in this disclosure and their structural equivalents, or in combinations of one or more of them. Embodiments of the subject matter described in this disclosure can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media.

The operations described in this disclosure can be implemented as operations performed by a data processing apparatus on data stored on one or more computer-readable storage devices or received from other sources. The term "data processing apparatus" encompasses all kinds of apparatus, devices, and machines for processing data, including by way of example a programmable processor, a computer, a system on a chip, or multiple ones, or combinations, of the foregoing. The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, e.g., web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform actions by operating on input data and generating output. Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. However, a computer need not have such devices. Moreover, a computer can be embedded in another device, e.g., a mobile telephone, a smart phone, a mobile audio or video player, a game console, a Global Positioning System (GPS) receiver, and a wearable computer device, to name just a few. Devices suitable for storing computer program instructions and data include all forms of non-volatile memory, media and memory devices, including by way of example semiconductor memory devices, magnetic disks, and the like. The processor and the memory can be supplemented by, or incorporated in, special purpose logic circuitry.

To provide for interaction with a user, embodiments of the subject matter described in this disclosure can be implemented on a computer having a display device for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input and output.

While this disclosure contains many specific implementation details, these should not be construed as limitations on the scope of the present disclosure or of what may be claimed, but rather as descriptions of features specific to particular embodiments of the present disclosure. Certain features that are described in this disclosure in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method comprising:
    obtaining data identifying a plurality of availability status features for a user of a communication service provider system, wherein the plurality of availability status features includes an action pattern feature that identifies successive actions taken by the user with respect to a particular service provided by the communication service provider system;
    determining a respective current value of each of the availability status features, wherein determining a current value of the action pattern feature comprises:
        determining that the user has taken more than a threshold number of successive actions with respect to communications received using the particular service provided by the communication service provider system and, in response, determining a pattern that indicates that the user is unavailable to receive communications; and
    determining an aggregate user availability status based at least in part on the current values of the availability status features.

2. The method of claim 1, wherein the plurality of availability status features includes an account parameters feature that identifies availability indicators associated with account parameters configured by the user with the communication service provider system.

3. The method of claim 1, wherein the plurality of availability status features includes a telephony status feature that identifies a line status for one or more communication devices associated with the user.

4. The method of claim 3, wherein the telephony status feature identifies an aggregated line status aggregated from respective line statuses of each of a plurality of communication devices associated with the user.

5. The method of claim 1, wherein the plurality of availability status features includes a communication status feature that identifies a non-telephony communication status of the user.

6. The method of claim 1, wherein the plurality of availability status features includes a location-based feature that identifies an availability indicator for the user that is derived from a physical location of the user.

7. The method of claim 1, further comprising:
    obtaining data identifying a respective weight for each of the availability status features, wherein determining the aggregate user availability status comprises determining the aggregate user availability status based at least in part on the current values of the availability status features and on the weights for the availability status features.

8. The method of claim 7, further comprising:
    determining the weights for the availability status features from interactions of other users with the communication service provider system based on, for each availability status feature, a proportion of time that the other users responded to communications while a value of the availability status feature indicated that the other user was unavailable to respond to the communication.

9. The method of claim 7, further comprising:
    receiving a user input modifying one or more of the availability status features or one or more of the weights; and
    modifying the availability status features for the user and the weights in response to the input.

10. The method of claim 1, wherein the plurality of availability status features includes an external availability status feature that identifies availability statuses for the user obtained by the communication service provider system from services that are not provided by the communication service provider system.

11. The method of claim 1, wherein the plurality of availability status features includes a session activity feature that identifies a time elapsed since a most recent interaction by the user with any service provided by the communication service provider system, and wherein determining a current value of the session activity feature comprises determining a current time elapsed since a current most recent interaction by the user with any service provided by the communication service provider system.

12. A system comprising one or more computers and one or more storage devices storing instructions that when executed by the one or more computers cause the one or more computers to perform operations comprising:
    obtaining data identifying a plurality of availability status features for a user of a communication service provider system, wherein the plurality of availability status features includes an action pattern feature that identifies successive actions taken by the user with respect to a particular service provided by the communication service provider system;
    determining a respective current value of each of the availability status features, wherein determining a current value of the action pattern feature comprises:
        determining that the user has taken more than a threshold number of successive actions with respect to communications received using the particular service provided by the communication service provider system and, in response, determining a pattern that indicates that the user is unavailable to receive communications; and determining an aggregate user availability status based at least in part on the current values of the availability status features.

13. The system of claim 12, wherein the plurality of availability status features includes an account parameters feature that identifies availability indicators associated with account parameters configured by the user with the communication service provider system.

14. The system of claim 12, wherein the plurality of availability status features includes a telephony status feature that identifies a line status for one or more communication devices associated with the user.

15. The system of claim 14, wherein the telephony status feature identifies an aggregated line status aggregated from respective line statuses of each of a plurality of communication devices associated with the user.

16. The system of claim 12, wherein the plurality of availability status features includes a communication status feature that identifies a non-telephony communication status of the user.

17. The system of claim 12, wherein the plurality of availability status features includes a location-based feature that identifies an availability indicator for the user that is derived from a physical location of the user.

18. The system of claim 12, the operations further comprising:

obtaining data identifying a respective weight for each of the availability status features, wherein determining the aggregate user availability status comprises determining the aggregate user availability status based at least in part on the current values of the availability status features and on the weights for the availability status features.

19. The system of claim 12, wherein the plurality of availability status features includes a session activity feature that identifies a time elapsed since a most recent interaction by the user with any service provided by the communication service provider system, and wherein determining a current value of the session activity feature comprises determining a current time elapsed since a current most recent interaction by the user with any service provided by the communication service provider system.

20. A computer program product encoded on one or more non-transitory computer readable media, the computer program product comprising instructions that when executed by one or more computers cause the one or more computers to perform operations comprising:

obtaining data identifying a plurality of availability status features for a user of a communication service provider system, wherein the plurality of availability status features includes an action pattern feature that identifies successive actions taken by the user with respect to a particular service provided by the communication service provider system;

determining a respective current value of each of the availability status features, wherein determining a current value of the action pattern feature comprises:

determining that the user has taken more than a threshold number of successive actions with respect to communications received using the particular service provided by the communication service provider system and, in response, determining a pattern that indicates that the user is unavailable to receive communications; and determining an aggregate user availability status based at least in part on the current values of the availability status features.

* * * * *